Patented Aug. 10, 1943

2,326,610

UNITED STATES PATENT OFFICE 2,326,610

EMULSIONS

Joseph N. Borglin, Wilmington, Del., assignor to Hercules Powder Company, Wilmington, Del., a corporation of Delaware No Drawing. Application March 26, 1941,
Serial No. 385,312

7 Claims. (Cl. 252—311.5)

This invention relates to emulsions of the oil-in-water type and more particularly to emulsions of this type wherein the dispersed phase comprises a substantial amount of free polymerized rosin.

Emulsions of rosin have been heretofore prepared by emulsifying or dispersing rosin in water in any suitable manner. Such emulsions have, in general, been unsatisfactory for many purposes particularly because of the low melting point of the rosin, the poor binding qualities of the emulsion, instability and deterioration due to the objectionable tendency of the rosin to oxidize or otherwise deteriorate, improper consistency, and for various other reasons.

It is an object of the present invention to provide an improved emulsion overcoming, to a large extent, the difficulties with prior art emulsions.

Another object is to prepare an emulsion of polymerized rosin in water.

Another object is to prepare an improved bituminous emulsion.

Another object is to prepare an improved resin emulsion or dispersion adapted to be used widely in the arts.

Still other objects will more fully hereinafter appear.

In accordance with the present invention, an emulsion of free or uncombined polymerized rosin in water is prepared. Polymerized rosin is characterized in general by properties similar to those of rosin but with the difference that it has a molecular weight within the range of 5% to 400% greater than ordinary rosin in its pure state, that it has a melting point as determined by the Hercules Drop method above 85° C. and in general from about 5° C. to about 100° C. above that of ordinary rosin in its pure state, that it is substantially free from hardening substances held in combination, and that it has an iodine value lower than that of rosin. It is preferred to employ polymerized wood rosin having a melting point varying from about 95° C. up to about 170° C., the melting point of the pure dimer. The dimer may be prepared by distilling the polymerized product under reduced pressure to remove rosin oil, unpolymerized rosin and other materials of low melting point, leaving the dimer as a residue.

Methods of making polymerized rosin are well known to the art and therefore need not be described here. The acid number of polymerized rosin may vary from that of rosin down to about 100.

I have discovered that aqueous emulsions of polymerized rosin offer numerous advantages for use in the arts, and are applicable in the manufacture of plastic and liquid coating compositions generally. Thus, the emulsions may be admixed with any suitable aggregate such as stone, cork or the like. The emulsions may also be used as coating and adhesive compositions either with or without other materials.

While it is preferred to emulsify or disperse free polymerized rosin alone, if desired emulsions may be prepared of polymerized rosin blended with other water-insoluble organic materials which are preferably characterized by solubility in volatile organic solvents and which generally exhibit binding properties, such as asphalt or other bituminous material, linseed oil, waxes, other resins such as gum sandarac, copal, ordinary rosin, phenol formaldehyde resins, alkyd resins, shellac, hydrogenated rosin, ester gum, cumarone resin, oil and resin modified alkyd and phenol formaldehyde resins, etc. In general, it is desirable that the polymerized rosin be present in substantial proportion say at least about 1% or more, and preferable that polymerized rosin constitute a preponderant portion, of the dispersed phase. An emulsion of bituminous material and of free polymerized rosin may advantageously be used as a binder for road aggregate, soil stabilization, etc.

Instead of emulsifying or dispersing the solid polymerized rosin or blend thereof with one or more of the foregoing materials, solutions thereof, either in a volatile organic solvent which is preferably water-insoluble, or in a non-volatile solvent such as mineral oil, linseed oil or the like, may be emulsified in water in accordance with the present invention.

The polymerized rosin or blend thereof may be emulsified in water in any of the conventional methods, for example, by melting the polymerized rosin and bringing it into contact with a hot aqueous solution of a suitable alkali whereupon there is formed an alkali soap of polymerized rosin which acts as the emulsifying agent. Alternatively, the polymerized rosin may be melted and commingled with a hot aqueous solution of any suitable emulsifying agent of the oil-in-water type such as ordinary fatty acid soap or polymerized rosin alkali soap. In the case where casein is used as the emulsifier, the polymerized rosin may be pulverized and admixed with the casein, and this mixture added to the water with vigorous agitation, ammonia being added to the mixture after thorough dispersion. Where a polymerized rosin soap and casein are used as the emulsifier, the polymerized rosin may be melted, and then partially neutralized with caustic alkali, followed by the addition of the casein solution and then by the addition of the water. If desired, the emulsion prepared thus or in some other way may finally be passed through a colloid mill to enhance its stability.

As the emulsifying agent, I may use any emulsifying agent of the oil-in-water type such as polymerized rosin alkali soap, soaps of ordinary rosin, fatty acid alkali soap, such as the soap of teaseed oil, corn oil, and other glyceride oils, sodium oleate, etc., alkali caseinates, sulfonated fatty glycerides, mixtures of the foregoing, etc. Examples of suitable alkalies for preparation of the soaps or the alkali caseinates are sodium, potassium, ammonium, or lithium hydroxides and carbonates, triethanolamine, organic substituted ammonias or ammonium hydroxides such as quaternary ammonium hydroxides, etc.

The proportions of the ingredients of the emulsion may vary within wide limits depending upon the emulsifying agent and upon other factors. Excellent emulsions have been prepared wherein the proportions by weight comprise from about 1% to about 70% of water-insoluble phase comprising free polymerized rosin, from about 1% to about 40% of emulsifying agent and from about 30% to about 98% of water or similar aqueous phase. Where polymerized rosin soap is the sole emulsifier, the amount thereof based on the weight of water-insoluble phase may advantageously range from about 35% to about 100% or more.

In the case of emulsions of bituminous material and polymerized rosin the proportions of the two phases and the emulsifier may be as just set forth. The proportions of bituminous material and polymerized rosin may vary from all polymerized rosin to about 1% polymerized rosin and 99% bituminous material. A preferred amount of polymerized rosin is from about 1% to about 20% on the weight of bituminous material, where the emulsion is to be used in road paving, in the preparation of mastics, etc.

The amount of water present in the emulsion will depend upon the nature of, amount of, and relative proportions of the other components and the use to which the emulsion is to be put, provided the emulsion is of the oil-in-water type.

If desired, there may be prepared an anhydrous or substantially anhydrous composition consisting of the polymerized rosin or blend thereof with other organic material, and the emulsifying agent. This composition may be prepared in any obvious manner and may be converted at the place of use into an emulsion by the addition of water followed, if desired, by passage of the mixture through a colloid mill or the like.

It is preferred to use water which is free from objectionable amounts of dissolved substances, for example, distilled water, rain water, softened hard water, etc.

Below are given several specific examples of emulsions and compositions adapted to yield emulsions and prepared in accordance with the present invention. In these examples, the polymerized rosin employed had the following characteristics: acid number 151, color 14–26 Amber, grade X to WG, drop melting point 98–101° C., color with 2% lead rosinate 25–40 Amber.

*Example 1*

|  | Per cent by weight |
|---|---|
| Mid-Continent asphalt (Arkansan, penetration 150–200) | 31.0 |
| Polymerized rosin | 5.2 |
| Sodium oleate | 1.8 |
| Water | 62.0 |

The polymerized resin and asphalt were melted together and the molten mixture and a solution of the sodium oleate in the water at 80° C. simultaneously passed through a colloid mill. A stable emulsion resulted.

*Example 2*

|  | Parts by weight | Per cent by weight |
|---|---|---|
| Polymerized rosin | 50 | 4.9 |
| Casein | 5 | 0.5 |
| 28% ammonia | 9 | 0.8 |
| Water | 950 | 93.5 |

The polymerized rosin was pulverized and admixed with the powdered casein. This mix was added with vigorous agitation to the water and, when thoroughly dispersed, the ammonia was added. Stirring was continued for 30 minutes. A stable gelatinous emulsion resulted.

*Example 3*

|  | Parts by weight | Per cent by weight |
|---|---|---|
| Polymerized rosin | 150 | 46.2 |
| Casein | 10 | 3.1 |
| 20% aqueous sodium hydroxide solution | 10 | 3.1 |
| Ammonia (28%) | 4.5 | 1.4 |
| Water | 150 | 46.2 |

The casein was stirred with the ammonia and diluted with water to a 10% solution. The polymerized rosin was melted and held at 105–110° C. whereupon the caustic solution was added with vigorous stirring. Thereupon the casein solution was stirred in. The balance of the water was then added to give a pasty, white emulsion of about 50% solids.

*Example 4*

|  | Per cent by weight |
|---|---|
| Polymerized rosin | 20.0 |
| Asphalt (California 180–200 penetration) | 39.6 |
| Polymerized rosin sodium soap | 4.2 |
| Water | 36.2 |

The correct amount of polymerized rosin was admixed with asphalt and the molten mixture run into a warm solution of the correct amount of sodium hydroxide in water. Upon passing the mixture through a colloid mill a stable emulsion was obtained.

*Example 5*

|  | Per cent by weight |
|---|---|
| Polymerized rosin | 32.3 |
| Asphalt (California 180–200 penetration) | 21.6 |
| Polymerized rosin sodium soap | 1.7 |
| Sodium oleate | 2.1 |
| Water | 42.3 |

The correct amounts of polymerized rosin and of oleic acid were fluxed with the asphalt and this mixture commingled with the correct amount of sodium hydroxide dissolved in water. Upon passing the mixture through a colloid mill a stable emulsion was obtained.

From the foregoing, it will be seen that the present invention enables the production of superior emulsions and compositions adapted to yield such emulsions. The marked resistance of the resulting emulsions and solids deposited therefrom to chemical deterioration upon exposure to the air or upon ageing, and the high melting point thereof is a particularly advantageous feature attendant upon the use of the present invention. Numerous other advantages of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. A composition of matter adapted to form an oil-in-water type emulsion upon addition of water comprising free polymerized rosin and an emulsifying agent therefor.

2. A substantially anhydrous composition of matter adapted to form an oil-in-water type emulsion upon addition of water comprising free polymerized rosin and an emulsifying agent therefor.

3. An emulsion comprising a continuous aqueous phase, a discontinuous dispersed phase comprising a solution of free polymerized rosin in a volatile water-insoluble organic solvent therefor, and an emulsifying agent adapted to maintain said dispersed phase.

4. An emulsion of the oil-in-water type comprising by weight from about 1% to about 70% of water-insoluble phase comprising free polymerized rosin, from about 1% to about 40% of an emulsifying agent capable of yielding an oil-in-water type emulsion, and from about 30% to about 98% of an aqueous phase.

5. A bituminous emulsion of the oil-in-water type comprising by weight from about 1% to about 70% of water-insoluble phase comprising a bituminous material and free polymerized rosin, from about 1% to about 40% of an emulsifying agent capable of yielding an oil-in-water type emulsion, and from about 30% to about 98% of an aqueous phase.

6. An emulsion of the oil-in-water type comprising free polymerized rosin, an alkali caseinate, and water.

7. An emulsion of the oil-in-water type comprising free polymerized rosin, an alkali caseinate, an alkali soap of polymerized rosin, and water.

JOSEPH N. BORGLIN.